United States Patent
Sung et al.

(10) Patent No.: US 9,128,674 B2
(45) Date of Patent: Sep. 8, 2015

(54) THERMAL PRESS AND ULTRAVIOLET CURING FOR DISPLAY ASSEMBLIES

(71) Applicant: Apple Inc., Cupertino, CA (US)

(72) Inventors: Kuo-Hua Sung, Cupertino, CA (US); Sang Ha Kim, Dublin, CA (US); Hsing Han Ho, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 13/941,377

(22) Filed: Jul. 12, 2013

(65) Prior Publication Data

US 2014/0071354 A1    Mar. 13, 2014

Related U.S. Application Data

(60) Provisional application No. 61/698,559, filed on Sep. 7, 2012.

(51) Int. Cl.
*G06F 1/16* (2006.01)
*B32B 38/00* (2006.01)
*G06F 3/041* (2006.01)

(52) U.S. Cl.
CPC .............. *G06F 1/1643* (2013.01); *B32B 38/00* (2013.01); *G06F 3/041* (2013.01); *G06F 2203/04103* (2013.01)

(58) Field of Classification Search
CPC ..... G06F 1/1643; G06F 3/041; G06F 3/0412; G06F 2203/04103; B32B 37/06; B32B 37/12; B32B 38/00; B32B 38/0036; B32B 38/0076
USPC .......... 345/173; 349/12; 156/275.5, 295, 350, 156/380.9, 583.1
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Tom Sheng
(74) *Attorney, Agent, or Firm* — Morrison & Foerster LLP (57) ABSTRACT

Methods for controlling deformation of laminated display assemblies are described. The laminated display assemblies can include flexible layers. In some embodiments, the flexible layers are sensor layers. Methods involving the use of a thermal press and ultra violet (UV) curing procedure are described. In one embodiment, a thermal press method can be performed by placing a laminated display assembly including the flexible substrate, an ink layer, an adhesive, and a cover on a temperature controlled fixture. A mechanical press can apply pressure to the top of the laminated display assembly. The mechanical press can remove any planar deformity of the flexible layer and can redistribute portions of the adhesive. Following the mechanical pressing, the laminated display assembly can be exposed to UV light to cure the adhesive and thereby fix in place the planar state of the laminated display assembly.

22 Claims, 9 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 5,926,171 A * | 7/1999 | Matsufusa et al. ............ 345/173 |
| 6,188,391 B1 | 2/2001 | Seely et al. |
| 6,221,194 B1 | 4/2001 | Watanabe et al. |
| 6,310,610 B1 | 10/2001 | Beaton et al. |
| 6,323,846 B1 | 11/2001 | Westerman et al. |
| 6,644,551 B2 | 11/2003 | Clayman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,614,680 B2 * | 12/2013 | Lin et al. ...................... 345/173 |
| 2006/0197753 A1 | 9/2006 | Hotelling |
| 2007/0196593 A1 | 8/2007 | Kim |
| 2011/0157061 A1 * | 6/2011 | Kao et al. ...................... 345/173 |
| 2011/0234526 A1 * | 9/2011 | Mi ................................ 345/174 |
| 2012/0325402 A1 * | 12/2012 | Suwa et al. ................ 156/275.5 |
| 2012/0328891 A1 * | 12/2012 | Suwa et al. ................... 428/522 |
| 2013/0033458 A1 * | 2/2013 | Lee et al. ...................... 345/175 |
| 2013/0194198 A1 * | 8/2013 | Guard et al. .................. 345/173 |
| 2013/0240116 A1 * | 9/2013 | Nonaka et al. .................. 156/64 |

FOREIGN PATENT DOCUMENTS

| | | |
|---|---|---|
| WO | WO 02/22281 | 3/2002 |
| WO | WO 2011/112447 | 9/2011 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

THERMAL PRESS AND ULTRAVIOLET CURING FOR DISPLAY ASSEMBLIES

CROSS-REFERENCE TO RELATED APPLICATIONS

This application claims the benefit of U.S. Provisional Patent Application No. 61/698,559, filed Sep. 7, 2012, and entitled THERMAL PRESS AND UV CURING, which is incorporated herein by reference in its entirety for all purposes.

FIELD OF THE DESCRIBED EMBODIMENTS

The described embodiments relate generally to laminated display assemblies, and more particularly, to methods for improving flatness and reducing optical defects and mechanical deformation during assembly processes for laminated display assemblies.

BACKGROUND

Display assemblies for electronic devices typically include multiple thin layers of substrates. For touch screen display assemblies, one or more of the layers can include a sensor layer which has a touch sensitive surface. In some cases, the sensor layer can be made of a flexible material, such as a flexible polymer. Oftentimes, the flexible polymer layer can be laminated to other substrates, such as a rigid cover. In some embodiments, the rigid cover may not be completely smooth, but include small surface perturbations. When attaching (laminating) the flexible polymer layer to such a surface, the flexible polymer layer may conform to these surface imperfections. When that happens, conformal irregularities can be formed that can impede or distort images, especially when the laminate formed by the flexible polymer and rigid cover is used in conjunction with a display.

SUMMARY

This paper describes various embodiments that relate to manufacturing processes for improving flatness and reducing visual defects in display assemblies for electronic devices. Methods for forming and treating display assemblies are described.

According to one embodiment, a method for planarizing a laminated display assembly is described. In a non-planar state, the laminated display assembly can include a substrate having a peripheral region and a central region, an ink layer overlaying and in contact with at least a portion of the peripheral region, an adhesive layer overlaying and in contact with at least a portion of the ink layer and the central region of the substrate including a stepped boundary zone, and a flexible sensor layer overlaying and in contact with the adhesive layer, where the flexible sensor layer conforms to the shape of the adhesive layer. The method includes causing the adhesive layer to at least partially liquefy. The method also includes applying a flattening pressure to the flexible sensor layer causing at least some of the at least partially liquefied adhesive layer to evenly redistribute between the ink layer and the central region. The method further includes forming a planar state of the laminated display assembly by fixing in place the evenly redistributed adhesive layer.

According to another embodiment, a thermal press for pressing a laminated stack up is described. The laminated stack up can include at stepped layer having a step with a step height corresponding to the thickness of the stepped layer. The laminated stack up can also include an adhesive layer disposed on and in contact with at least a portion of the stepped layer. The adhesive layer can have a stepped zone corresponding to the step when the laminated stack up is in an initial state. The laminated stack up can additionally include a flexible layer disposed on and in contact with the adhesive layer. The flexible layer can have a bent region corresponding to the stepped zone when the laminated stack up is in the initial state. The thermal press can include a lower portion having a first flat surface arranged to accept a bottom surface of the laminated stack up. The lower portion can also have a heating element arranged to heat the adhesive layer to a temperature sufficient to transform the adhesive layer to at least a partially liquid state. The thermal press can also include an upper portion having a second flat surface arranged to be placed on a top surface of the laminated stack up. The thermal press can further include a mechanical press arranged to apply a flattening pressure on the upper portion. The flattening pressure can flattens the bent region and redistributes at least a portion of the at least partially liquefied adhesive layer.

According to a further embodiment, a non-transitory computer readable medium for storing computer code executed by a processor in a computer for operating a thermal press for pressing a laminated stack up is described. The laminated stack up includes a stepped layer, an adhesive layer and a flexible layer. The thermal press includes a lower portion arranged to support the laminated stack up and including a heating element. The thermal press also including an upper portion arranged to be placed on top of the laminated stack up. The thermal press additionally includes a mechanical press arranged to apply pressure to the upper portion toward the lower portion. The non-transitory computer readable medium includes computer code for causing the heating element to heat the adhesive layer to at least partially liquefy. The non-transitory computer readable medium also includes computer code for causing the mechanical press to apply a flattening pressure to the flexible layer. The flattening pressure can causes a bent portion corresponding to a step of the stepped layer to flatten. The flattening pressure also causes at least some of the at least partially liquefied adhesive layer to evenly redistribute between the stepped layer and the flexible layer.

According to an additional embodiment, a display assembly for a portable electronic device is described. The display assembly includes a rigid cover having a central viewing region and a peripheral region. The display assembly also includes an opaque ink layer disposed on the peripheral region. The opaque ink layer includes a step having a step height corresponding to a thickness of the opaque ink layer. The display assembly also includes an adhesive layer disposed on at least a portion of the opaque ink layer and the central viewing region of the rigid cover. The display assembly also includes a flexible sensor layer disposed on the adhesive layer. The adhesive layer is distributed between the flexible sensor layer and the opaque ink layer and the central viewing region of the rigid cover such that the flexible sensor layer has a substantially planar shape proximate to the step.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Embodiments described herein relate to methods for manufacturing laminated display assemblies, sometime referred to as display assemblies herein, for electronic devices. The methods described herein can be used to planarize a display assembly and reduce the amount of defects caused by non-planar portions of one or more flexible layers as part of the display assembly. The display assembly can be, for example, a flexible sensor layer as part of a touch sensitive display assembly. In some embodiments, the flexible layer that has portions made of a flexible resin or polymer based material. In addition to the flexible layer, the display assembly can include other layers such as a rigid cover used as an exterior surface of the display, an ink layer used for cosmetic purposes, and one or more adhesive layers disposed between and used to bond adjacent layers to each other.

The methods described herein can include placing a display assembly on a temperature controlled fixture. A mechanical press can apply pressure to the top of the display assembly. Applied temperature, pressure, and time can be determined, in part, by display assembly dimensions and minimum temperature and pressure required to cause the adhesive to at least partially liquefy into a conformable state. Subsequent to the thermal and pressing process, a curing process to fix in place the planar state of the display assembly can be used. These and other aspects are described in more detail with respect to FIGS. 1-10 provided below.

Figure 1:
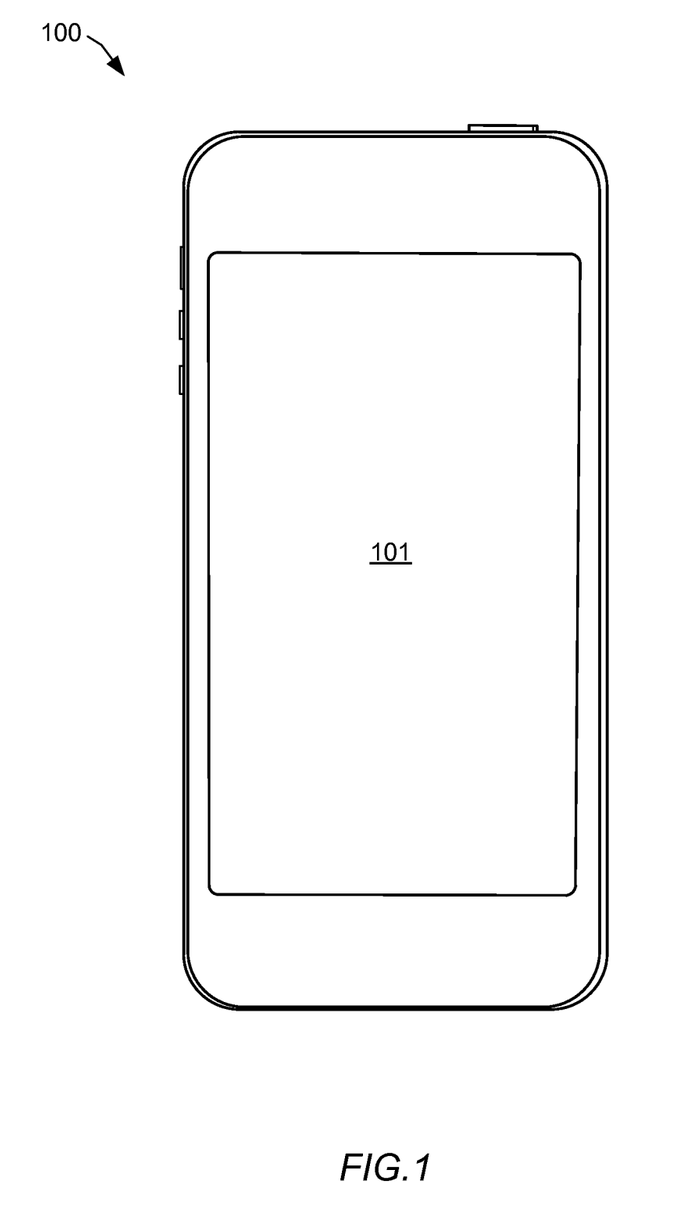
FIG. 1 shows a front view of a portable electronic device having a display.

Methods described are well suited for manufacture of display assemblies for computers, smart phones and media players, such as those designed and sold by Apple Inc. headquartered in Cupertino, Calif. FIG. 1 shows a portable electronic device 100 having a display 101, suitable for methods described herein. Portable electronic device 100 can be sized for one-handed operation and placement into small areas such as a pocket, i.e., portable electronic device 100 can be a handheld pocket sized electronic device. By way of example, the portable electronic device 100 may correspond to a smart phone, music player, game player, video player, personal digital assistant (PDA), and/or the like. Display 101 can be used to display a graphical user interface (GUI) as well as other information to the user (e.g., text, objects, and graphics). In some embodiments, display 101 is a touch sensitive display that is configured to receive one or more touch inputs that help control various operations of the device and aspects of what is being displayed on the display 101. In some cases, the one or more inputs can be simultaneously received (e.g., multi-touch). In some embodiments, portable electronic device 100 is small enough to be held in a hand of a user and viewed by a user at close distance. Thus, even small defects that exist in display 101 can be visible to a user.

Figure 2:
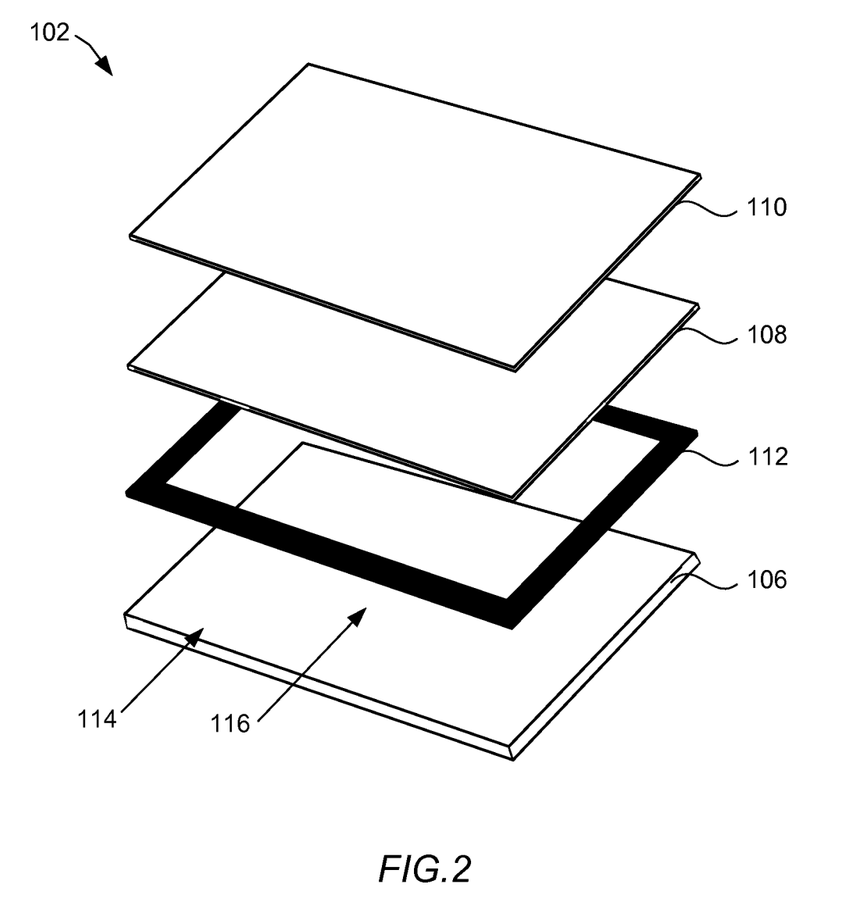
FIG. 2 shows an exploded view of a laminated display assembly.

Display 101 can include a top protective transparent or semitransparent cover. The cover can be made of glass, polymer, or other suitable material. Underlying the cover can be a laminated stack up of layers as part of a display assembly. FIG. 2 shows an exploded view of a laminated display assembly 102, herein also referred to simply as a display assembly. Display assembly can include a cover 106, ink layer 112, adhesive 108 and flexible layer 110. Ink layer 112 can be a substantially opaque material that is typically applied around perimeter portions of display assembly 102. In one embodiment, ink layer 112 has a black color Ink layer 112 is generally used for cosmetic purposes, such as to hide shadow areas or underlying electronic components. In the embodiment shown, ink layer 112 has a central opening that provides for viewing the central region of display assembly 101. In this way, cover 106 can have a peripheral region 114, which is overlaid by ink layer 112, and central region 116 which is not overlaid by ink layer 112 and which is associated with the viewing area of display assembly 102. Flexible layer 110 can be a touch sensitive flexible sensor layer that includes a number of sensors configured to activate as a user's finger touches the external surface of cover 106. In some embodiments, more than one flexible sensor layer is used. In a simple case, an electrical signal can be produced each time the finger passes a sensor. The number of signals in a given time frame may indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed, and acceleration information. This information may then be used by the portable electronic device 100 to perform the desired control function relative to the display 101. Flexible layer 110 can include any of a number of suitable flexible materials, including those with high expansion/shrinking characteristics such as, but not limited to, polyethylene terephthalate, polycarbonate, and cycloolefin polymer.

Figure 3:
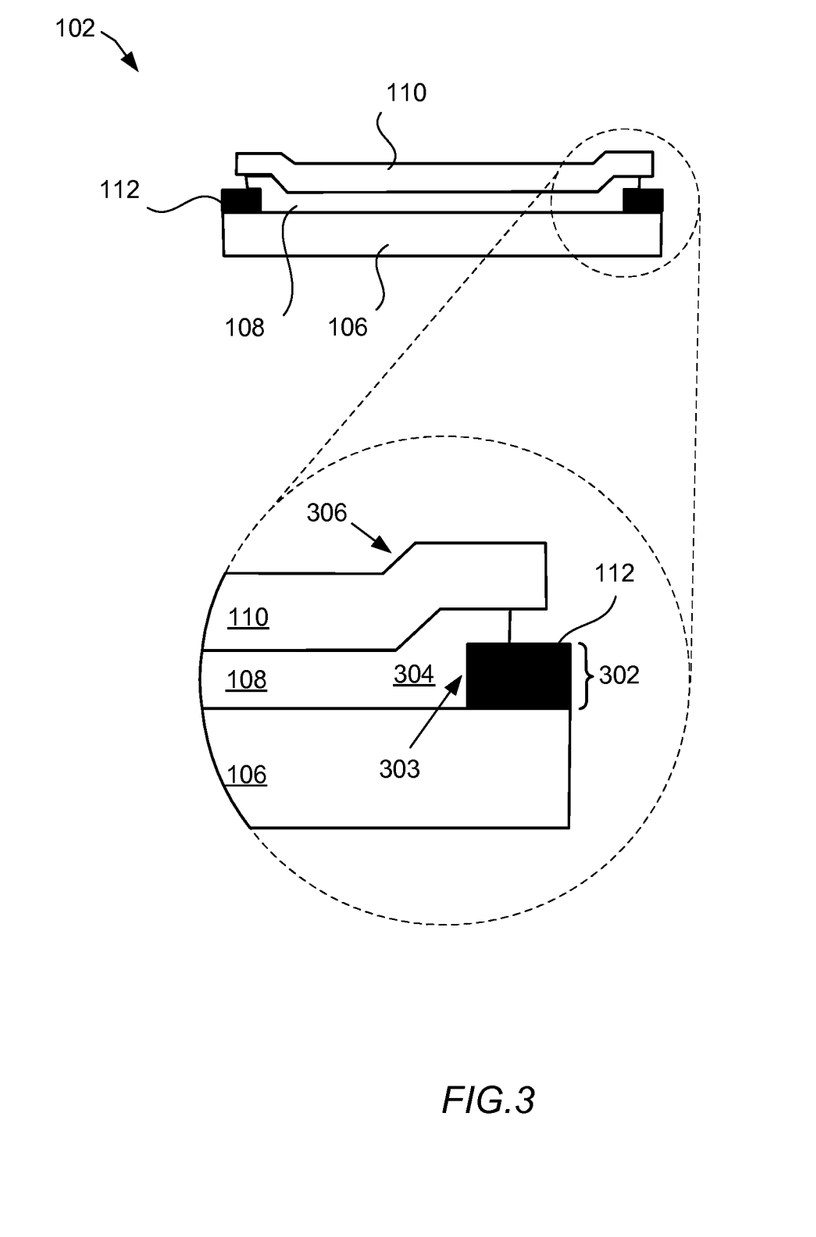
FIG. 3 shows a cross section view of a laminated display assembly.

FIG. 3 shows a cross section view of display assembly 102 that has been assembled. As shown, cover 106, ink layer 112, adhesive 108, and flexible layer 110 can be assembled sequentially. In one embodiment, ink layer 112 overlays and is in contact with at least portion of a bonding surface of cover 106, adhesive 108 overlays and is in contact with at least a portion of the ink layer and central portion 116 of cover 106, and flexible layer 110 overlays and is in contact with adhesive 108. In other embodiments, the order and the number of layers within a laminated display assembly can vary. As described above, cover 106 generally serves as a protective layer for the display assembly and is typically transparent or semi-transparent. Cover 106 is generally made of a rigid material such a glass or a rigid polymer Ink layer 112 can be applied around perimeter portions of cover 106 and is generally used as a cosmetic layer. As shown, ink layer 112 only partially covers underlying cover 106, thereby leaving a central viewing area that is not covered by ink layer 112. Since ink layer 112 has an associated thickness 302, a step 303 is created between ink layer 112 and cover 106. Step 303 has a step height corresponding to thickness 302. As adhesive layer 108 is formed over ink layer 112 and cover 106, the adhesive conforms to step 303 and a step boundary zone 304 is created. Adhesive 108 can be any suitable adhesive for bonding two layers together within a laminated display assembly. Adhesive 108 can be a reflowable or conformable adhesive. For example, adhesive 108 can be in liquid form during an assembly process. In some embodiments, adhesive 108 is optically clear. Adhesive 108 can be thermally or UV curable such that it cures to a hardened form when exposed to heat or ultraviolet (UV) light.

As shown in FIG. 3, flexible layer 110 can comply with the shape of underlying layers. In particular, flexible layer 110 can deform from a planar configuration to non-planar configuration when assembled onto underlying layers 106, 112 and 108. In particular, flexible layer 110 can include a bent portion 306 that is associated with stepped boundary zone 304 of adhesive layer 108. In some applications where there is more than one sensor layer or other flexible layer, stepped boundary zone 304 can cause deformation or bending of more than one sensor layer or flexible layer. In some cases, cover 106 may not be completely planar. That is, the thickness of cover 106 can vary and have localized thin portions (not shown) that can also cause flexible layer 110 to deform. Deformations in flexible layer 110, including bent portion 306, can be associated with optically observable defects from the exterior surface of cover 106 when display assembly 102 is fully assembled. In some cases, the deformations can appear as visual inconsistencies, such as shadows. In some cases, bent portion 109 can cause a distortion or wavy appearance in regions proximate to ink layer 112. These visual inconsistencies can be exacerbated if more than one sensor layer or flexible substrate in the display assembly is deformed. In some embodiments, ink layer 112 can have a thickness of between about 9 to 75 microns, creating an associated step height of step 302. In many cases this step height can be visually observable since it has been found that step heights of about 1 micron and above can cause visually detectable defects.

Figure 4:
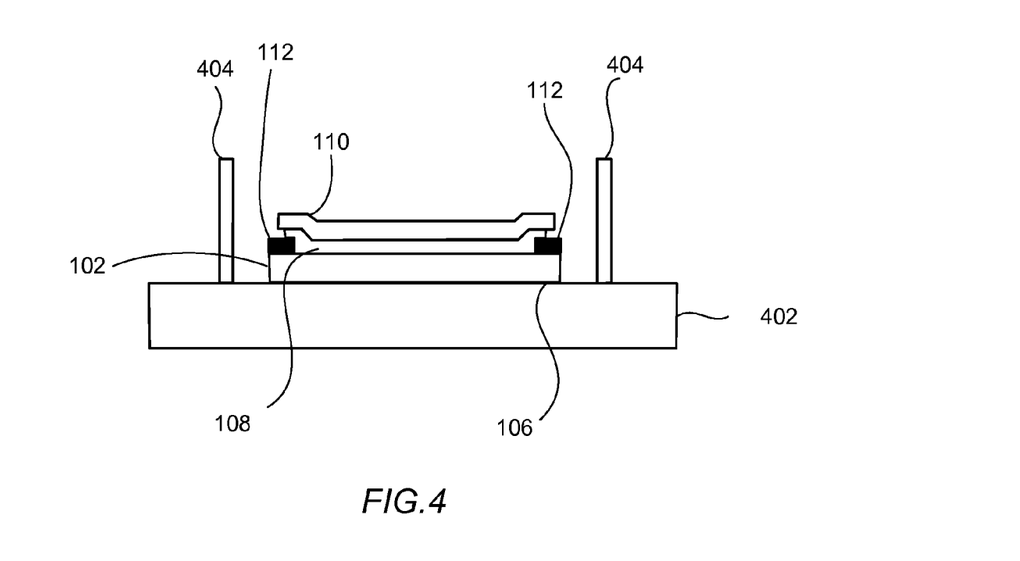
FIG. 4 shows a cross section view of the laminated display assembly placed on a thermal press.

Methods described herein can be used for controlling the deformation of a flexible substrate, such as flexible layer 110, thereby reducing visual defects of a display assembly. Methods can include a thermal press operation and a UV curing operation. In some embodiments, the thermal press process and an UV curing process are separate processes. In alternative embodiments, the thermal press process and UV curing process are combined in one process. FIG. 4 shows a cross section view of display assembly 102 placed on a thermal press. In some embodiments, display assembly 102 is pre-assembled prior to placement in the thermal press. In an alternate embodiment, display assembly 102 is assembled in the thermal press. Display assembly 102 can be placed on a surface of a lower portion 102 of the thermal press. The thermal press can include the lower portion 102, an upper portion (not shown), and alignment pins 404. Lower portion 102 can have a flat surface to provide a good flat base during a subsequent pressing procedure. Alignment pins 404 can be use to maintain the position of display assembly 102 during subsequent heating and pressing procedures. It should be noted that although FIG. 4 shows two alignment pins 404, in other embodiments the thermal press can have less or more than two alignment pins. In the embodiment shown in FIG. 4, cover is placed onto lower portion 102. In alternative embodiments, flexible layer 110 can be place onto lower portion 102.

Figure 5:
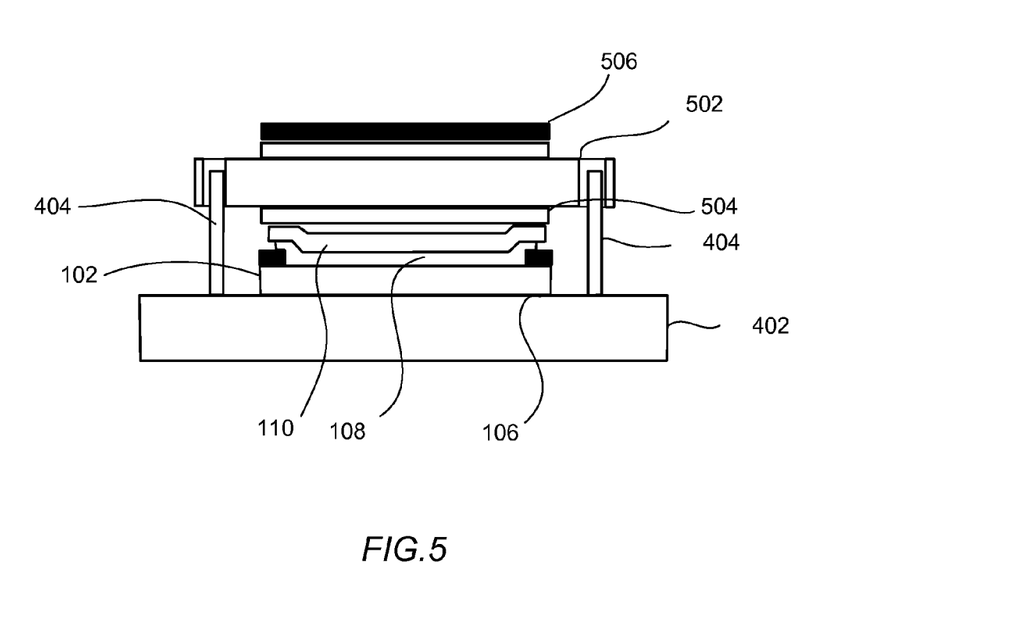
FIG. 5 shows a cross section view of an upper portion of the thermal press positioned over the laminated display assembly.

FIG. 5 shows a cross section view of upper portion 502 of the thermal press positioned over display assembly 102. Alignment pins 404 can guide upper portion 502 to be properly positioned over display assembly 102 and lower portion 402. The thermal press can be configured to heat display assembly 102 during a pressing operation. In one embodiment, lower portion 402 includes heating elements (not shown). In some embodiments, one or both of lower portion 402 and upper portion 502 include heating elements. In some embodiments, one or both of lower portion 402 and upper portion 502 can be made of heat conductive material, such as metal. In one embodiment, a pad 504 can be positioned between flexible layer 110 and upper portion 502 to evenly distribute pressure and allow compliance between flexible layer 110 and upper portion 502. Pad 504 can also protect the surface of sensor 110 from damage from contact with upper portion 502. In one embodiment, additional pad 506 can be placed above upper portion 502 to eliminate localized pressure that can be introduced when pressure is applied during a subsequent pressing operation. Pads 504 and 506 can be made of any suitable compliant material, such as silicone or rubber material.

Figure 6:
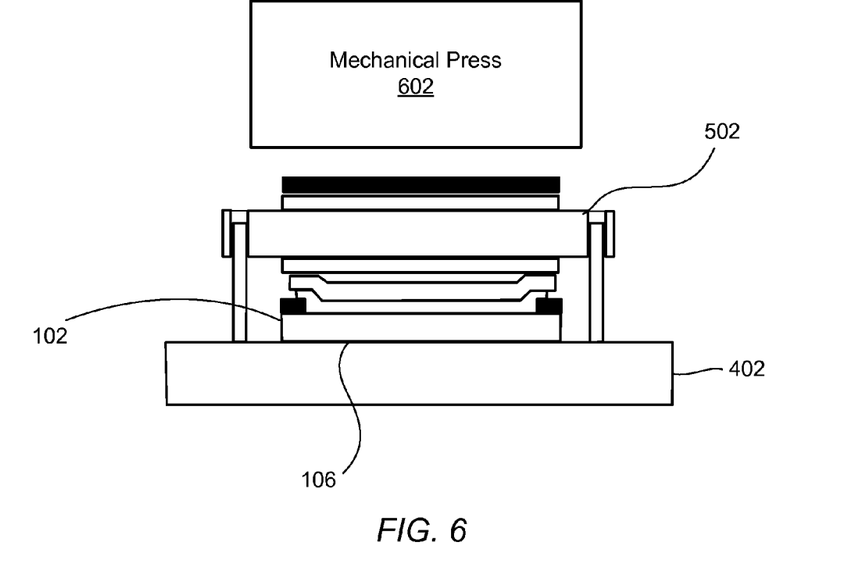
FIG. 6 shows a cross section view of the thermal press as a mechanical press is moved into position over the laminated display assembly.

FIG. 6 shows a cross section view of upper portion 502 and lower portion 402 of the thermal press as a mechanical press 602 is moved into position. In one embodiment, the temperature of the thermal press can be monitored and controlled using a thermocouple. The temperature can be brought to a predetermined temperature. The heat from the thermal press can raise the temperature of adhesive 108 to a liquefaction temperature corresponding to the predetermined temperature of the thermal press. When adhesive 108 is at the liquefaction temperature, the adhesive can take on an at least partially liquid state.

Figure 7:
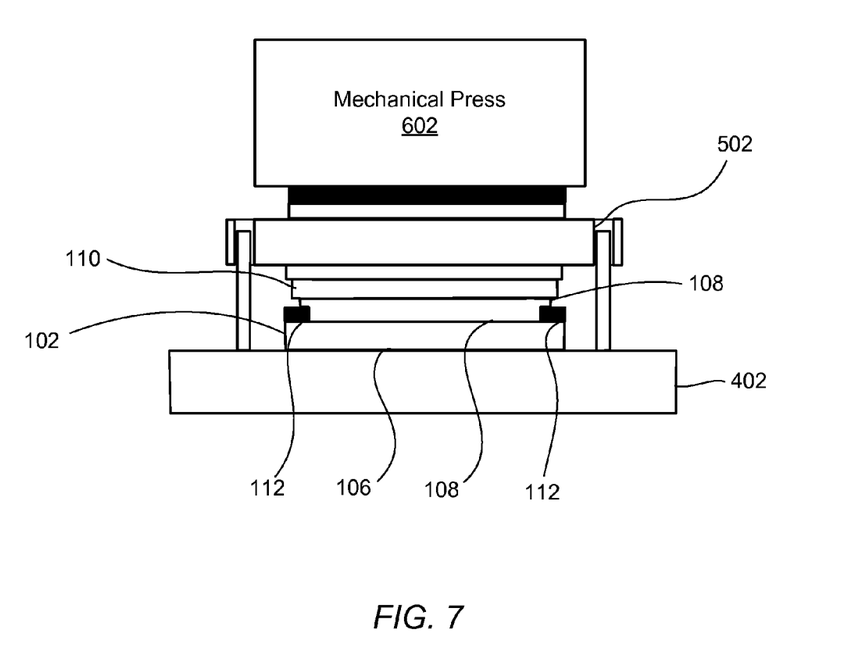
FIG. 7 shows a cross section view of the mechanical press exerting pressure on the laminated display assembly.

FIG. 7 shows a cross section view of mechanical press 602 exerting pressure to display assembly 102. The pressure, also referred to as a flattening pressure, can be applied in a direction substantially perpendicular to the bonding surface of cover 106. In one embodiment, the flattening pressure is applied in a substantially perpendicular direction in relation to lower portion 402 such that upper portion 502 is maintained at a position substantially parallel to lower portion 402. In one embodiment, the pressure for mechanical press 602 can be provided by an air or pneumatic mechanism (not shown), such as by air cylinders. In some embodiments, the pressure from mechanical press 602 can be monitored and controlled during the pressing operation and exerted for a predetermined amount of time until a desired flatness is achieved. As show, the applied pressure can substantially flatten flexible layer 110 and cause at least some of at least partially liquefied adhesive 108 to evenly distribute between ink layer 112 and central region 116 (shown in FIG. 2) of cover 106. In addition, the applied flattening pressure can straighten bent portion 306 and force flexible layer 110 to take on a substantially planar shape. Adhesive 108 can take on a size and shape to support and maintain the substantially planar shape of flexible layer 110. Since the planar configuration of flexible layer 110 no longer includes bent portion 306, the visible defects associated with bent portion 306 can be eliminated. In addition, any other bent regions of flexible layer 110 associated with localized irregularities and non-planar portions of cover 106 can also be straightened. In some embodiments, the flattening pressure is applied in multiple intervals such that the movement of at the least partially liquefied adhesive 108 can be controlled. For example, the amount of overflow of adhesive 108 can be controlled such that adhesive 108 does not overflow into unwanted areas of cover 106 or outside of display assembly 102.

Figure 8:
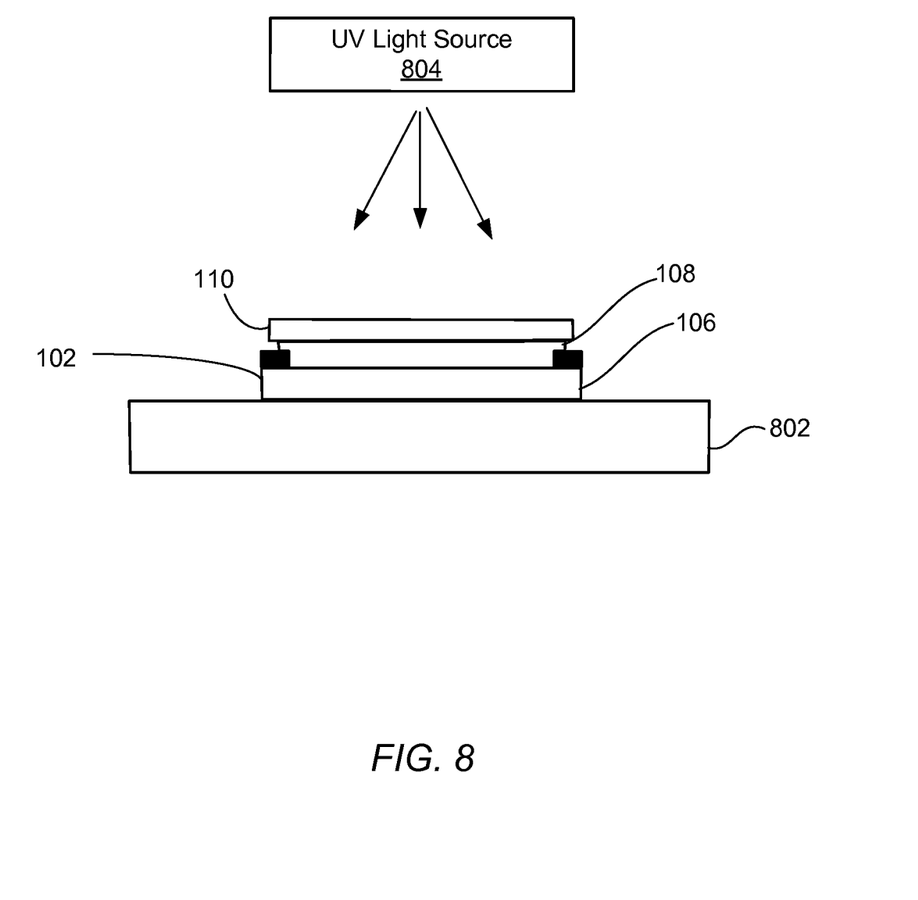
FIG. 8 shows a cross section view of a laminated display assembly undergoing exposure to UV light.

After flexible layer 110 is flattened to a sufficiently planar state and adhesive 108 is evenly distributed, display assembly 102 can be fixed in the planar state. This can be done by reducing the temperature of the liquefied adhesive 108 to a hardened state. In some embodiments, hardening adhesive can be achieved by exposing display assembly 102 to UV light, also referred to as a UV curing procedure. FIG. 8 shows a cross section view of display assembly 102 undergoing a UV curing procedure from light source 804. Display assembly is positioned on fixture 802. In one embodiment, fixture 802 is a movable conveyor that is configured to move display assembly 102 from the thermal press of FIGS. 4-7 to UV light source 804. In the embodiment shown in FIG. 8, UV light source 804 is positioned above display assembly 102. In some embodiments, fixture 802 is UV light transparent such that display assembly 102 can be exposed to UV light from a UV light source positioned below fixture 802. In other embodiments, more than one UV light source can be used. For example, a first UV light source can be positioned above display assembly 102 and a second UV light source can be positioned below display assembly 102.

In some embodiments, exposure to UV light occurs as quickly as possible following the thermal pressing operation in order to prevent flexible layer 110 from rebounding from its planar form. In one embodiment, the exposure to UV light can occur less than two minutes after pressure from the thermal press is removed from display assembly 102. UV light exposure time can vary depending, in part, on the type of adhesive 108, as well as thickness and opacity of flexible layer 110, adhesive 108, and cover 106. Display assembly 102 can be exposed to UV light for a time period until at least a portion of adhesive 108 is sufficiently cured to maintain display assembly 102 in its planar state after the curing process is complete. In some embodiments, the UV intensity is monitored using a dosage indicator. In one embodiment, the laminated stack up is exposed to UV light until about 85% or more of the adhesive is cured.

According to some embodiments, the thermal press procedure and UV light exposure are implemented on a single apparatus. In this way, exposure to UV light can be done immediately after the thermal pressing operation. Thus, the amount of time between the thermal press operation and the UV curing operation can be reduced, thereby reducing the occurrence of deformation of display assembly from a planar state. In some embodiments, this is done by configuring the thermal press apparatus of FIGS. 4-7 to accommodate UV light exposure. Returning to FIG. 7, in one embodiment, after the thermal pressing operation is complete, mechanical press 602 and upper portion 502 are removed to expose a top surface of display assembly 102. Then, a UV light source (not shown) positioned above display assembly 102 can be used to expose display assembly 102 to UV light. In some embodiments, one or both of lower portion 402 and upper portion 502 can include UV light transparent materials. This configuration can allow display assembly 102 to be exposed to UV light while still under pressure.

Figure 9:
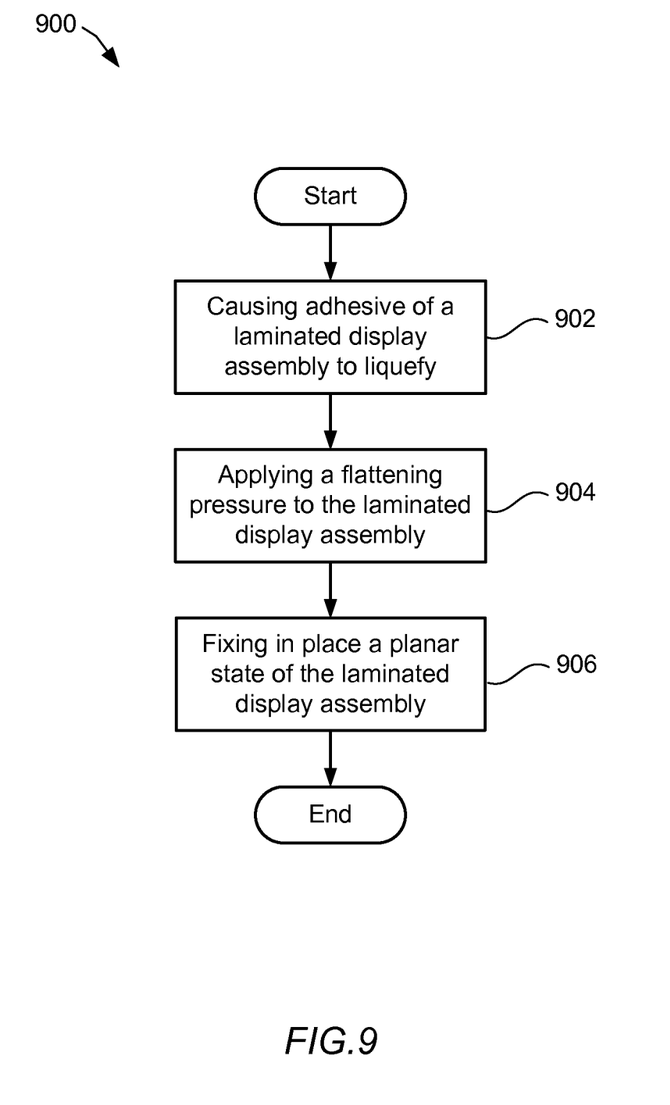
FIG. 9 shows a flowchart indicating a method for forming planarizing a laminated display assembly.

FIG. 9 shows flowchart 900 indicating a method for planarizing a laminated display assembly in accordance with described embodiments. The display assembly in a non-planar state can include a substrate having a peripheral region and a central region, an ink layer overlying and in contact with at least a portion of the peripheral region, an adhesive overlaying and in contact with at least a portion of the ink layer and the central region of a bonding surface of the substrate, and a flexible layer overlaying and in contact with the adhesive layer. In some embodiments, the substrate is a rigid cover, such as a glass or rigid polymer cover. In some embodiments, at least a portion of the cover is substantially transparent. The adhesive layer can have a stepped boundary zone corresponding to the transition from the ink layer to the central region. The flexible layer can be a sensor layer that is configured to receive one or more touch inputs from a user of the electronic device and to send electronic information corresponding to the one or more touch inputs to at least one component of the electronic device. The flexible layer can conform to the shape of the adhesive layer, including the stepped boundary zone. In this way, the flexible layer can have a bent portion which corresponds to the stepped boundary zone. In some embodiments, more than one flexible layer is used, with each flexible layer having a bent portion corresponding to the stepped boundary zone. The one or more bent portions of the flexible layer can be associated with visual defects that are observable from a top surface of the substrate. In some cases, the visual defects can appear as distortions or inconsistencies in regions proximate to the stepped boundary zone.

At 902, the adhesive of the laminated display assembly is caused to at least partially liquefy. The adhesive can be an optically clear adhesive so as to allow unobstructed viewing of a display image. Liquefying or partially liquefying the adhesive can be accomplished by heating the adhesive to a liquefaction temperature. In some embodiments, the heating can occur by placing the laminated display assembly in a thermal press, such as the thermal press shown in FIGS. 4-7. In one embodiment, the laminated stack up is pre-assembled prior to placement in the thermal press. In an alternate embodiment, the laminated stack up is assembled in the thermal press. In one embodiment, lower portion 402 is heated to a predetermined temperature until the adhesive at least partially liquefies. As described above, the temperature of the lower portion can be monitored and controlled using a thermocouple.

At 904, a flattening pressure is applied to the laminated display assembly while the adhesive is in the at least partially liquefied state. In some embodiments, the pressure is applied at the same time as the liquefying procedure of 902. In some embodiments, the pressure is applied in a substantially perpendicular direction in relation to the bonding surface of the substrate. In some embodiments, the pressure is applied to an upper portion of the thermal press in a direction substantially perpendicular to the lower portion of the thermal press. In response to the applied pressure, the one or more flexible layers can take on a substantially planar shape. In addition, at least some of the at least partially liquefied adhesive can redistribute within the laminated display assembly to evenly distribute between the ink layer and the central region of the substrate. In some cases, some of the at least partially liquefied adhesive can redistribute within recesses at the bonding surface of the substrate created by localized thin portions of the substrate. The amount of pressure applied can vary depending upon a number of factors, such as thickness and compliance of the one or more flexible layers and the temperature at which the adhesive is heated.

After the one or more flexible layers take on substantially planar shapes and the adhesive is evenly distributed, at 906, the planar state of the laminated display assembly is fixed in place. In some embodiments, the fixing in place involves curing the liquefied adhesive. The curing can involve reducing the temperature of the adhesive below the liquefaction temperature. In some embodiments, the curing can involve exposing the liquefied adhesive to UV light. In one embodiment, the laminated display assembly is exposed to UV in a separate apparatus as the thermal pressing apparatus. In another embodiment, the UV exposure takes place in the thermal press apparatus. In one embodiment, the UV exposure begins in less than two minutes after pressure from the thermal press is removed from laminated display assembly. In one embodiment, the UV exposure takes place while the flattening pressure is applied to the laminated display assembly. The laminated display assembly can be exposed to UV light for a time period sufficient to fix the planar shape of the flexible layer within the laminated display assembly when exposed to ambient conditions (e.g. room temperature). The UV light exposure can vary depending, in part, on the intensity of the UV light and thicknesses and amount of adhesive within the laminated display assembly. In some embodiments, the UV intensity is monitored using a dosage indicator.

In its fixed planar state, the laminated display assembly has a flexible layer that is fixed in the substantially planar shape. That is, the bent portion present in the initial non-planar state is flattened. Thus, the visual defects that can be seen from an exterior surface of the substrate associated with the bent portion can be reduced or eliminated. In addition, visual defects associated with bent portions of the flexible layer associated with localized thin regions of the substrate can be reduced or eliminated.

Figure 10A:
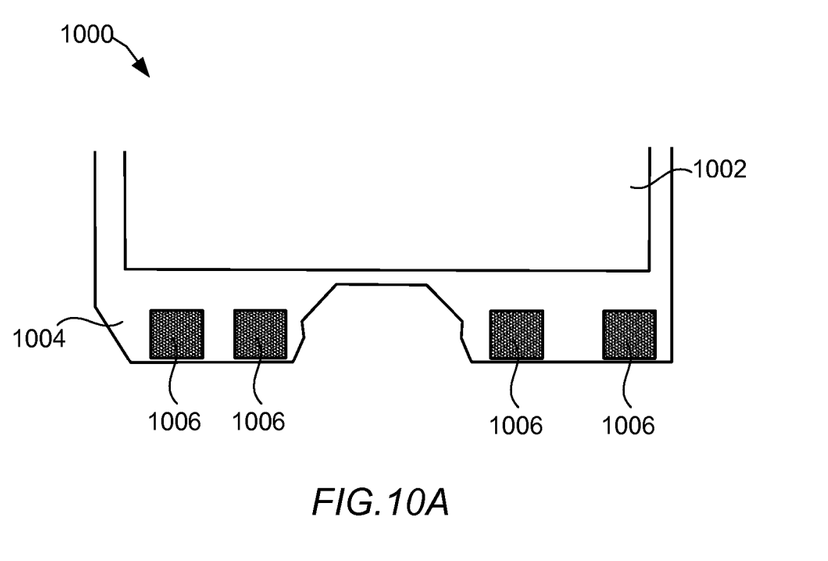
FIGS. 10A and 10B show top views of portions of flexible substrates having different designs.
Figure 10B:
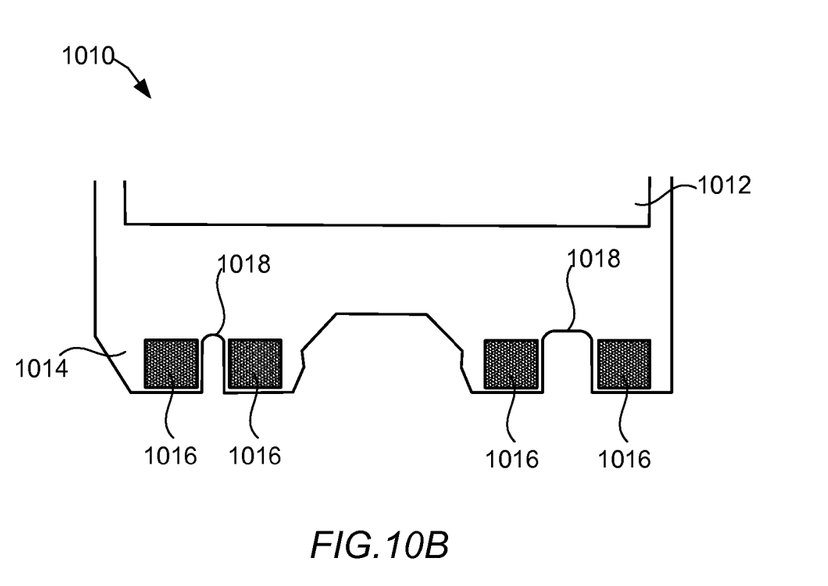

In some embodiments, the flexible layer can be designed to accommodate for the deformation prior to the planarization process. Turning back to FIG. 1, prior to a thermal press procedure, flexible layer 110 can become deformed when it is positioned adjacent to ink layer 112. As described above, this can be due to the flexibility and thinness of flexible layer 110. This deformation can cause the edged of flexible layer 110 to pull inward and away from the perimeter of display assembly 102. This can be an issue if the edges of flexible layer 110 have connection features that are used to connect flexible layer 110 to other components. To illustrate, FIG. 10A shows a top view of a portion of flexible layer 1000 that includes viewing area 1002 and bonding area 1004. Bonding area 1004 has bond pads 1006 that are typically conductive portions that are used to make electrical connections between flexible layer 1000 and one or more electrical components of a computing device. When flexible layer 1000 is overlaid on a stepped boundary zone, as described above, it can deform such that bond pads 1006 pull away from the edges of the laminated display assembly, thereby limiting access to bond pads 1006. FIG. 10B shows a top view of a portion of flexible layer 1010, which includes viewing area 1012 and bonding area 1014. As shown, bond pads 1016 are positioned at a larger distance away from viewing area 1012 compared to the configuration of flexible layer 1000. This configuration can assure that bond pads 1016 remain readily accessible during deformation that flexible layer 1010 can experience when disposed on a stepped boundary zone and also during a thermal pressing operation, as described above. In addition, flexible layer 1010 can include notches 1018 that can reduce electrical interference between adjacent bond pads 1016.

Figure 11:
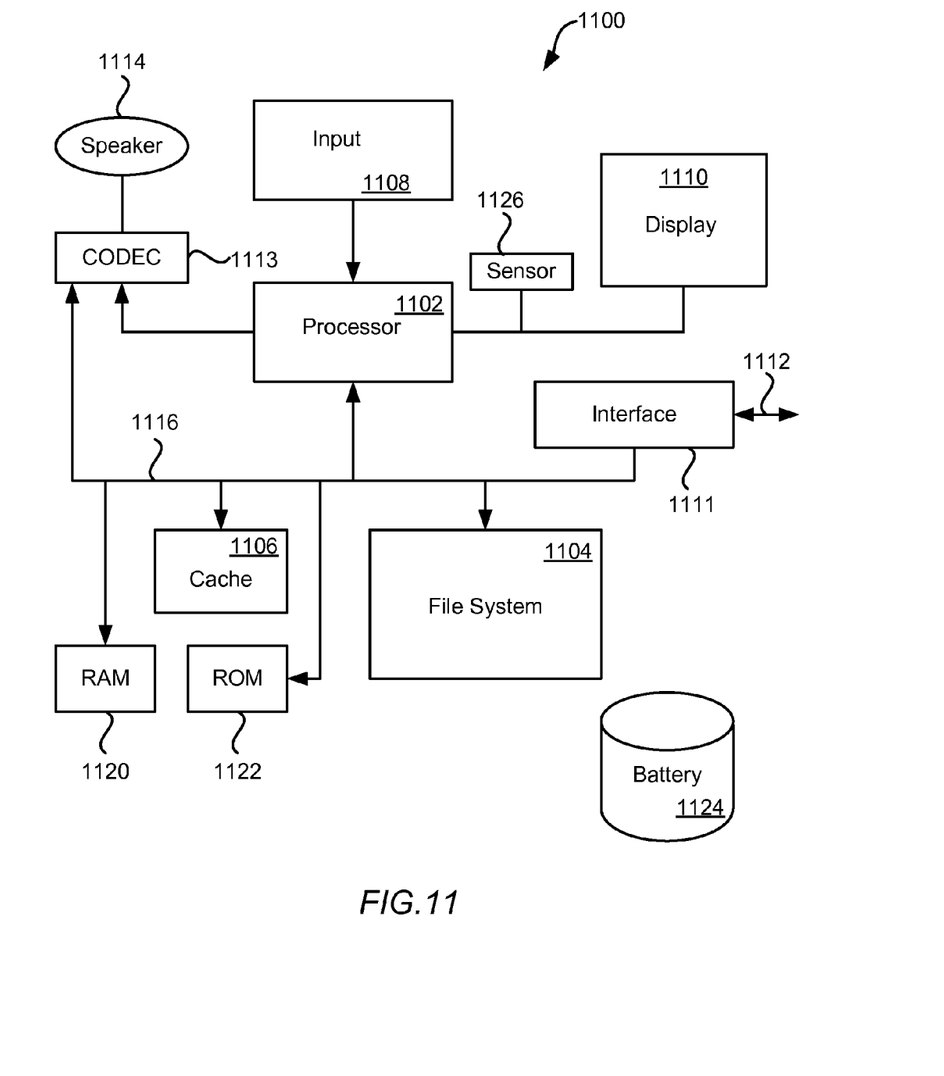
FIG. 11 is a block diagram of an electronic device suitable for use with the described embodiments.

FIG. 11 is a block diagram of electronic device 1100 suitable for controlling some of the processes in the described embodiment. Electronic device 1100 illustrates circuitry of a representative computing device, such as for a computer aided manufacturing system used to control the thermal press and/or UV light fixture described above. Electronic device 1100 includes a processor 1102 that pertains to a microprocessor or controller for controlling the overall operation of electronic device 1100. Electronic device 1100 contains instruction data pertaining to manufacturing instructions in a file system 1104 and a cache 1106. The file system 1104 is, typically, a storage disk or a plurality of disks. The file system 1104 typically provides high capacity storage capability for the electronic device 1100. However, since the access time to the file system 1104 can be relatively slow, electronic device 1100 can also include a cache 1106. Cache 1106 can be, for example, Random-Access Memory (RAM) provided by semiconductor memory. The relative access time to the cache 1106 can be substantially shorter than for the file system 1104. However, cache 1106 may not have the large storage capacity of the file system 1104. Further, file system 1104, when active, can consume more power than cache 1106. The power consumption is often a concern when the electronic device 1100 is a portable device that is powered by a battery 1124. The electronic device 1100 can also include a RAM 1120 and a Read-Only Memory (ROM) 1122. ROM 1122 can store programs, utilities or processes to be executed in a non-volatile manner. RAM 1120 can provide volatile data storage, such as for cache 1106.

Electronic device 1100 can also include a user input device 1108 that allows a user of the electronic device 1100 to interact with the electronic device 1100. For example, a user input device 1108 can take a variety of forms, such as a button, keypad, dial, touch screen, audio input interface, visual/image capture input interface, input in the form of sensor data, etc. Still further, the electronic device 1100 can include a display 1110 (screen display) that can be controlled by the processor 1102 to display information to the user. Data bus 1116 can facilitate data transfer between at least the file system 1104, the cache 1106, the processor 1102, and a coder/decoder (CODEC) 1113. CODEC 1113 can be used to decode and play a plurality of media items from file system 1104 that can correspond to certain activities taking place during a particular manufacturing process. Processor 1102, upon a certain manufacturing event occurring, supplies the media data (e.g., audio file) for the particular media item to a CODEC 1113. CODEC 1113 can then produce analog output signals for a speaker 1114. Speaker 1114 can be a speaker internal to electronic device 1100 or external to electronic device 1100. For example, headphones or earphones that connect to the electronic device 1100 would be considered an external speaker.

Electronic device 1100 can also include a network/bus interface 1111 that couples to a data link 1112. Data link 1112 can allow electronic device 1100 to couple to a host computer or to accessory devices. Data link 1112 can be provided over a wired connection or a wireless connection. In the case of a wireless connection, network/bus interface 1111 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1126 can take the form of circuitry for detecting any number of stimuli. For example, sensor 1126 can include any number of sensors for monitoring a manufacturing operation such as for example a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling manufacturing operations or as computer readable code on a non-transitory computer readable medium for controlling a manufacturing line. The non-transitory computer readable medium is any data storage device that can store data which can thereafter be read by a computer system. Examples of the non-transitory computer readable medium include read-only memory, random-access memory, CD-ROMs, DVDs, magnetic tape, optical data storage devices, and carrier waves. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for planarizing a laminated display assembly, comprising:
   in a non-planar state, the laminated display assembly comprises:
      a substrate comprising a peripheral region and a central region,
      an ink layer overlaying and in contact with at least a portion of the peripheral region, the ink layer having a thickness that creates a step between an edge of the ink layer and the central region,
      an adhesive overlaying and in contact with at least a portion of the ink layer and the central region of the substrate, and
      a flexible sensor layer overlaying and in contact with the adhesive, the flexible sensor layer conforming to the shape of the adhesive;
   heating a portion of a thermal press to at least partially liquefy the adhesive;
   applying a flattening pressure to at least the flexible sensor layer causing at least some of the at least partially liquefied adhesive to evenly redistribute between the ink layer and the central region; and
   forming a planar state of the laminated display assembly by fixing in place the evenly redistributed adhesive.

2. The method as recited in claim 1, wherein the fixing in place comprises curing the adhesive subsequent to the redistribution of the at least partially liquefied adhesive.

3. The method as recited in claim 2, wherein the curing comprises: reducing the temperature of the adhesive to a curing temperature that is less than a liquefaction temperature of the adhesive.

4. The method as recited in claim 2, wherein the curing comprises: exposing the adhesive to ultraviolet light.

5. The method as recited in claim 1, wherein heating the adhesive comprises heating a lower portion of the thermal press.

6. The method as recited in claim 1, wherein the planar state of the laminated display assembly has less visual defects than the non-planar state of the laminated display assembly.

7. The method as recited in claim 1, wherein the substrate has a planar shape and remains in the planar shape while the flattening pressure is applied to at least the flexible sensor layer.

8. The method as recited in claim 1, wherein forming the planar state of the laminated display assembly begins before the laminated display assembly rebounds to a non-planar state.

9. A thermal press for pressing a laminated stack up, the laminated stack up comprising:
   a stepped layer overlaying a portion of a substrate layer, the stepped layer having a thickness creating a step between an edge of the stepped layer and the substrate layer,
   an adhesive disposed on and in contact with at least a portion of the stepped layer and the substrate layer, wherein the adhesive at least partially conforms in shape to the step when the adhesive is in an initial state,
   a flexible layer disposed on and in contact with the adhesive, wherein the flexible layer comprises a bent region corresponding to the step when the laminated stack up is in the initial state,
   the thermal press comprising:
      a lower portion having a first flat surface arranged to accept a bottom surface of the laminated stack up placed thereon, and a heating element arranged to heat the adhesive to a temperature sufficient to transform the adhesive to at least a partially liquid state;
      an upper portion having a second flat surface arranged to be placed on a top surface of the laminated stack up; and
      a mechanical press arranged to apply a flattening pressure on the upper portion, wherein the flattening pressure flattens the bent region and redistributes at least a portion of the at least partially liquefied adhesive.

10. The thermal press of claim 9, further comprising: an ultraviolet light source arranged to set a planar state of the laminated stack up by curing the adhesive while the bent region remains flattened.

11. The thermal press as recited in claim 10, wherein the thermal press is configured to cure the adhesive while the flattening pressure is applied to the laminated stack up.

12. The thermal press as recited in claim 11, wherein at least one of the upper and lower portions have an ultraviolet light transparent portion.

13. The thermal press of claim 9, wherein the upper portion comprises at least one pad to evenly distribute the flattening pressure across at least the top surface of the laminated stackup.

14. The thermal press of claim 9, further comprising at least one alignment pin arranged to maintain a position of the laminated stack up relative to the thermal press.

15. The thermal press of claim 14, wherein the at least on alignment pin is arranged to properly position the upper portion on the laminated stack up.

16. A non-transitory computer readable medium for storing computer code executed by a processor in a computer for operating a thermal press for pressing a laminated stack up, the laminated stack up comprising a stepped layer, an adhesive and a flexible layer, the thermal press comprising:
- a lower portion arranged to support the laminated stack up and comprising a heating element,
- an upper portion arranged to be placed on top of the laminated stack up, and
- a mechanical press arranged to apply a pressure to the upper portion toward the lower portion, the non-transitory computer readable medium comprising:
- computer code for causing the heating element to at least partially liquefy the adhesive; and
- computer code for causing the mechanical press to apply the pressure to the flexible layer causing a bent portion corresponding to a step of the stepped layer to flatten and causing at least some of the at least partially liquefied adhesive to evenly redistribute between the stepped layer and the flexible layer.

17. The non-transitory computer readable medium of claim 16, wherein the thermal press further comprises:
an ultraviolet light source arranged to set a flattened shape of the flexible layer within the laminated stack up by curing the adhesive while the bent portion remains flattened.

18. A display assembly for a portable electronic device, comprising:
- a rigid cover having a central viewing region and a peripheral region;
- an opaque ink layer disposed on the peripheral region, wherein the opaque ink layer includes a step having a step height corresponding to a thickness of the opaque ink layer;
- an adhesive disposed on at least a portion of the opaque ink layer and the central viewing region of the rigid cover; and
- a flexible sensor layer disposed on the adhesive, wherein the adhesive is distributed between the flexible sensor layer and the opaque ink layer and the central viewing region of the rigid cover such that the flexible sensor layer has a substantially planar shape proximate to the step.

19. The display assembly as recited in claim 18, wherein the opaque ink layer frames the viewing region of the rigid cover.

20. The display assembly as recited in claim 18, wherein the flexible sensor layer is configured to receive touch input from a user of the portable electronic device and send electronic information corresponding to the touch input to at least one component of the portable electronic device.

21. The display assembly as recited in claim 18, wherein the flexible sensor layer comprises a flexible polymer material.

22. The display assembly as recited in claim 18, wherein the adhesive is sized and shaped to maintain the substantially planar shape of the flexible sensor layer.

\* \* \* \* \*